P. F. LYNCH.
EAR CORN HOLDING DEVICE.
APPLICATION FILED SEPT. 10, 1914.
1,117,412.
Patented Nov. 17, 1914.
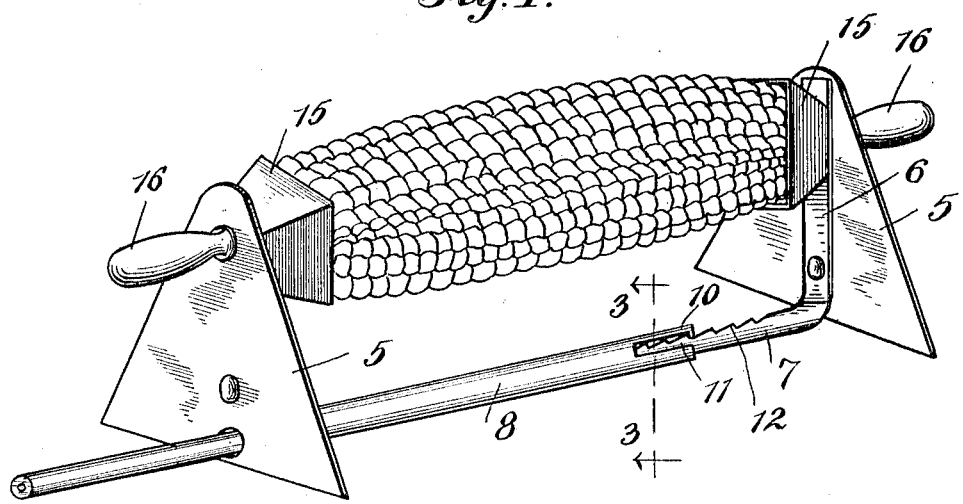
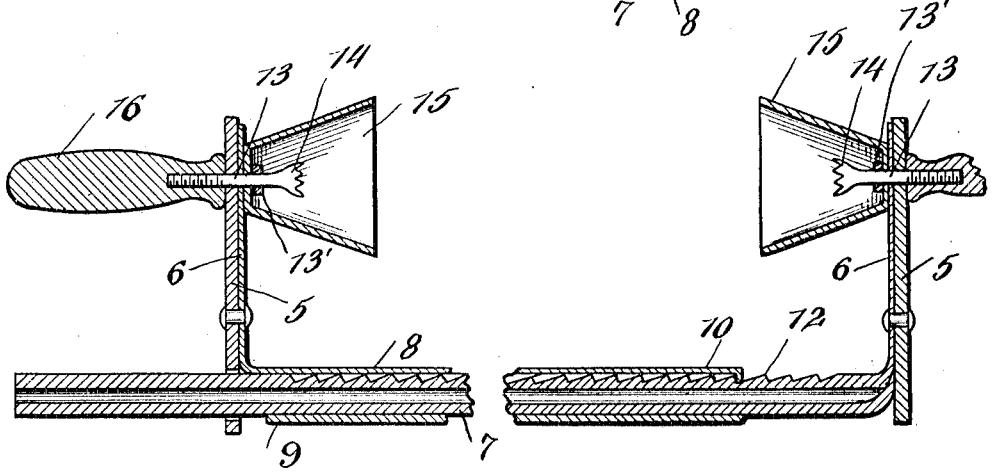
Witnesses
Wynne Johnson
Inventor
P. F. Lynch
By
C. L. Parker
Attorneys

UNITED STATES PATENT OFFICE.

PATRICK F. LYNCH, OF DANBURY, CONNECTICUT.

EAR-CORN-HOLDING DEVICE.

1,117,412.  Specification of Letters Patent.  Patented Nov. 17, 1914.

Application filed September 10, 1914.  Serial No. 861,072.

*To all whom it may concern:*

Be it known that I, PATRICK F. LYNCH, a citizen of the United States, residing at Danbury, in the county of Fairfield and State of Connecticut, have invented certain new and useful Improvements in Ear-Corn-Holding Devices, of which the following is a specification.

My invention relates to improvements in ear-corn holding devices.

The invention aims to provide a device of the above mentioned character, which is simple in construction, inexpensive to manufacture, convenient in use, and neat in appearance.

Other objects and advantages of the invention will be apparent during the course of the following description.

In the accompanying drawings forming a part of this specification and in which like numerals are employed to designate like parts throughout the same, Figure 1 is a perspective view of an ear-corn holding device embodying my invention, Fig. 2 is a central longitudinal sectional view through the same, and, Fig. 3 is a transverse section taken on line 3—3 of Fig. 1.

In the drawings, wherein for the purpose of illustration is shown a preferred embodiment of the invention, the numeral 5 designates preferably triangular end-supports or members to which are rigidly connected vertical strips 6, having longitudinally extending tubes or members 7 and 8 rigidly connected and preferably formed integral therewith. The tube 7 preferably telescopes the tube 8, and passes outwardly beyond the opposite end 9 of the tube 8, as shown. It is obvious that the end-supports 5 may be moved toward and away from each other, in accordance with the size of the ear-corn, to be held by means to be described.

Means are provided to lock the tube 8 upon the tube 7 in adjustment at a desired longitudinal position, comprising a spring catch or tongue 10 carried by the tube 8 and preferably stamped therefrom, by providing openings 11, as shown. This spring tongue engages teeth 12 formed upon the longitudinal tube or member 7, as shown.

Rotatably mounted through the upper ends of the end-supports 5 are spindles 13, provided at their inner ends with enlarged toothed heads 14, to engage with the ends of the ear of corn, for holding the same in place and rotate the same. Surrounding the toothed heads 14 are cups 15, preferably square in cross-section and increasing in width inwardly. These cups are carried by the spindles 13 which pass through the apertured ends thereof. The spindles carry stop-rings 13', as shown. The spindles 13 extend outwardly beyond the end-supports 5 and have handles 16 rigidly attached thereto, by means of which the spindles may be moved or turned.

In use, the ear of corn is arranged between the cups 15, and the adjustable end-support 5 moved toward the other end support 5 until the ends of the ear of corn enter the cups 15 and properly engage with the toothed heads 14. The catch automatically locks the adjustable end support 5 in the proper position. With the ear of corn thus held by the device, the operator takes hold of the handles 16 by means of which the ear of corn may be raised to the mouth, and turned upon its longitudinal axis with respect to the device, to expedite the eating thereof. The device may be laid upon the table and will support the ear of corn in spaced relation from the same.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:—

An ear corn holding device, comprising end supports adapted to be laid upon a table or the like and to extend substantially vertical with relation thereto, a longitudinal substantially horizontal rod attached to one substantially vertical end support and provided with longitudinally arranged ratchet teeth, a longitudinal substantially horizontal tube attached to the other end support and adjustably receiving the longitudinal rod therein and provided at its inner free end with spaced longitudinal slots affording a holding pawl therebetween which extends longitudinally of the tube and has tripping engagement with the ratchet teeth to releasably hold the longitudinal rod in adjustment with relation to the tube but allowing of longitudinal movement thereof upon the application of sufficient pressure, substantially horizontal spindles journaled through the upper ends of the end supports and provided upon their inner ends with toothed heads to engage with the ends of the ear of corn, and substantially horizontal handles secured to the ends of the spindles to turn the same and to effect the longitudinal adjustment of the rod with relation to the tube, substantially as described.

In testimony whereof I affix my signature in presence of two witnesses.

PATRICK F. LYNCH.

Witnesses:
　LULA M. SNIFFEN,
　WILLIAM F. DOBBS.